Aug. 16, 1949.  H. B. GIBBONS ET AL  2,479,342
COMPOSITE STRUCTURE FOR USE
IN AIRCRAFT CONSTRUCTION

Filed Dec. 9, 1943  2 Sheets-Sheet 1

INVENTOR
Henry B. Gibbons
Eugene G. Zoldy
BY Charles L. Shelton
ATTORNEY.

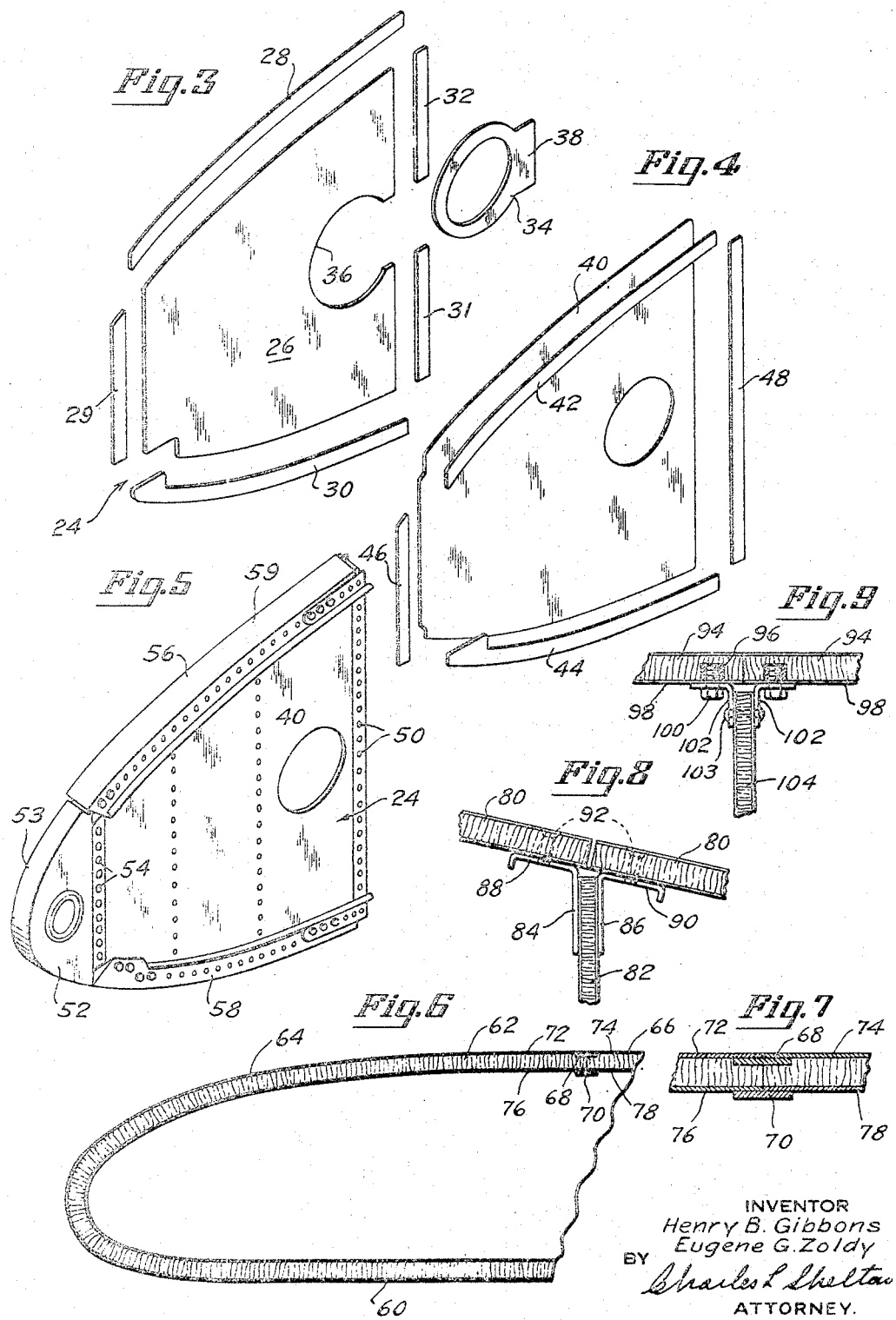

Patented Aug. 16, 1949

2,479,342

UNITED STATES PATENT OFFICE 2,479,342

COMPOSITE STRUCTURE FOR USE IN AIRCRAFT CONSTRUCTION

Henry B. Gibbons, Stratford, and Eugene G. Zoldy, Ridgefield, Conn., assignors to United Aircraft Corporation, East Hartford, Conn., a corporation of Delaware Application December 9, 1943, Serial No. 513,618

2 Claims. (Cl. 154—43)

1

This invention relates to improvements in composite structures of metallic and non-metallic materials and to improved methods for making the same; and has particular reference to lightweight, rigid assemblies of this type for use in aircraft construction.

The invention has among its objects to provide an improved adhesive bond between metallic and non-metallic surfaces, between two metallic surfaces, or between two non-metallic surfaces.

Another object of the invention is to provide a unitary laminated structure, or sandwich, including a core of non-metallic material having outer layers, or sheaths, of facing material bonded thereto that are thin relative to the thickness of the core, and which is characterized by extremely great strength and rigidity for its weight.

A further object of the invention is to provide a structural material of the above type which can be produced in shapes suitable for aircraft structures.

A still further object of the invention is to provide an improved aircraft surface material characterized by a high degree of inherent smoothness, absence of wrinkling or buckling when heavily loaded and great reduction in the amount of auxiliary supporting structure.

A still further object of the invention is to provide an improved composite structure for utilization in tooling, such as a mold of mild curvature, characterized by a high degree of rigidity and lightness in weight.

A further object of the invention is to provide a panel structure which can be readily formed to double or compound curvatures commonly found in aircraft structures.

A further object of the invention is to provide an improved method for making a composite structure which can be carried out at low temperatures and pressures, enabling the use of desirable core materials hitherto prohibited by the temperatures and pressures previously required.

A further object is generally to improve the construction and methods of making aircraft.

These and other objects of the invention will be apparent from the following detailed description of a preferred method of constructing composite panels and a preferred form of panel structure for use in aircraft construction, several illustrative embodiments of which are shown in the accompanying drawings.

In the drawings, wherein similar reference characters refer to similar parts throughout the several views, Fig. 1 is a perspective view illustrating a plane sandwich constructed in accordance with the present invention.

Fig. 3 is an exploded perspective view of a core structure for a rib in an airplane wing leading edge assembly.

Fig. 4 is a similar view showing one of the overlying plates and associated reinforcing strips for the core of Fig. 3.

Fig. 5 is a perspective view of the assembled rib.

Fig. 6 is a sectional view through an airfoil body constructed in accordance with the invention, the rear portion thereof being largely broken away to facilitate illustration.

Fig. 7 is an enlarged detail of a joint between the front and rear sections of the airfoil body of Fig. 6.

Fig. 8 is an enlarged detail showing one construction for securing removable panels to the airplane frame structure.

Fig. 9 shows another construction for securing removable panels to the frame structure.

Figure 1:
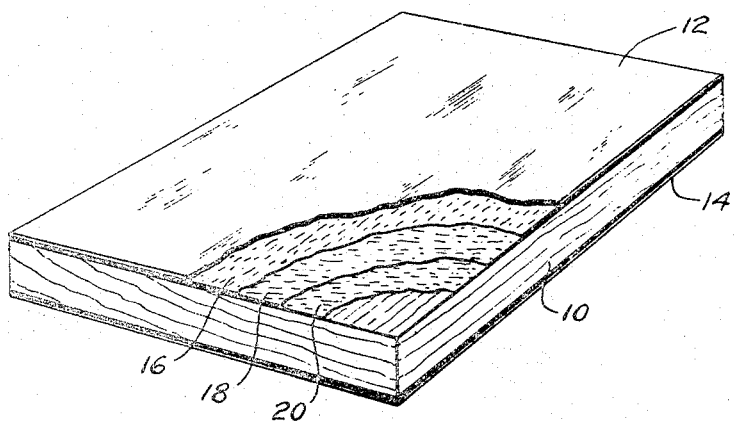

The composite panel in which the invention is embodied is shown in Fig. 1 as comprising a flat core 10 sheathed on opposite sides by relatively thin sheet laminations 12 and 14. The core 10 may comprise any suitable material such as wood or other cellular or fibrous material or lightweight synthetic compositions. At present it is preferred, however, to use balsa wood, or equivalent woods, due to their extreme lightness in weight, this invention making possible the use of these desirable materials to obtain extremely rigid structures. However, specific application may dictate the use of a stronger, heavier wood or other suitable material for the core. The sheets 12 and 14 may be of high strength synthetic material or of steel, aluminum or magnesium to suit different conditions, but for aircraft construction strong alloys of aluminum are preferred. By way of example, sheets of .040 inch thickness or less generally are suitable for forming surface panels utilized in the construction of the fuselage and wings of aircraft. For the purpose of disclosing the invention, a core of balsa wood has been illustrated with sheets of aluminum bonded thereto.

In making the panel, or sandwich, of Fig. 1, the surface of the aluminum sheets 12 and 14 which are to be bonded to the core 10 are first thoroughly cleaned and then coated with a thin layer 16 of adhesive cement, which may be a phenol-formaldehyde base resin, or one containing phenol-formaldehyde resin, which possesses a strong affinity for metal. Excellent results have been obtained with "Cycleweld C-3" cement. This is a polymerizable resin adhesive sold by the Chrysler Corporation of Detroit, Michigan, which has the characteristic as set forth elsewhere in this specification of bonding itself strongly to metal when polymerized at a temperature of approximately 325° F. for about fifteen minutes. For a complete understanding and description of "Cycleweld" cement, reference is made to U. S. Patent No. 2,376,854. When the resin layers have dried, they are then polymerized at 325° F. for approximately fifteen minutes. This temperature and time for curing may be varied slightly but the figures specified have been found satisfactory for "Cycleweld." Following this curing step, a coating 18 of another adhesive cement which may be a phenol-formaldehyde base resin which possesses marked affinity for wood and also for the previously polymerized adhesive, is applied over the first resin coating on the metal sheets. A coating 20 of this second type resin adhesive is also applied to the surfaces of the wood core 10 to which the sheets are to be bonded. For the second adhesive "Durez" No. 12,041, a phenol-formaldehyde base resin, reduced with the proper hardening agent, or accelerator, supplied by the manufacturer has been found very satisfactory, as this cement has a strong affinity for both wood and "Cycleweld" cement. "Durez" No. 12,041 is a polymerizable resin described by its manufacturer, Durez Plastics and Chemicals, Inc., North Tonawanda, New York, as a high viscosity concentrated solution of a one-step thermo-setting phenol-formaldehyde resin used with an acid accelerator to obtain a proper cure and bond at a relatively low temperature. This resin has the characteristic as set forth herein of bonding itself strongly to a surface coating of polymerized "Cycleweld" and also to non-metallic core materials and may be cured at low temperatures and low pressures which are not destructive to such core materials as balsa wood, for example, at a temperature of approximately 140° F. for four hours. "Durez" No. 12,041 is believed to undergo a desirable chemical interaction with the "Cycleweld" when subjected to the following curing process.

The sandwich is assembled on a rigid mold and placed under pressure, which may be obtained negatively by placing the entire assembly in a rubber bag, which is then sealed and evacuated. If the sandwich being produced is to serve as a skin panel, the sheet placed against the mold should be the external skin surface. If additional pressure is needed, this entire assembly may be placed in a pressure chamber or autoclave. While still being subjected to pressure the assembly is placed in curing apparatus at 140° F. for a period of four hours. Here again the time and temperature specified are merely illustrative, as the time and temperature used are variables contingent on the type of construction, particularly the material comprising the core, and the loads to which it is to be subjected. Also if the temperature of 140° F. specified should be too high for a particular core material, a lower temperature may be used in which case the curing time will be increased proportionately or, conversely, if the material used in the core is capable of withstanding a higher temperature, a higher temperature can be used and the curing time shortened. For a balsa wood core a curing temperature of 240° F. for thirty minutes is possible without injury to the wood.

It is during this curing process of the assembled structure that chemical interaction is believed to take place between the two resins, one having a specific affinity for metal and the other having a specific affinity for wood and for the first resin, which results in a permanent bond between the metal and wood surfaces of superior strength, and between adjacent metal surfaces where splices or reinforcements are incorporated in the face sheets. Irrespective of the nature of the interaction between the two resins, there is a definite blending together of these two resins prior to setting so that when they are set, an especially strong bond occurs between them. This increase in strength of the bond is believed to be obtained through the polymerization of the "Cycleweld" with the second resin. When the assembled structure is removed from the curing apparatus, a further curing or setting period of approximately twelve hours, with pressure relieved and at the above mentioned temperature, may be used when it is desired to develop the extremely high strengths which are inherent in the structure. During this setting period the sandwich structure can be further fabricated for eventual incorporation into finished aircraft assemblies.

Figure 2:
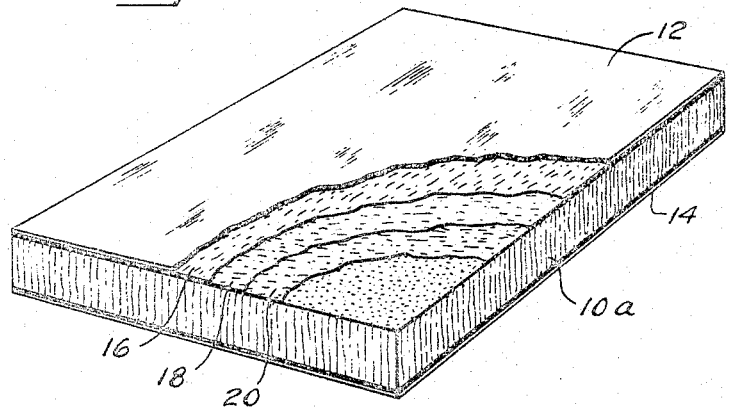
Fig. 2 is a similar view showing a modified construction of core member.

The Fig. 2 construction differs from that of Fig. 1 in having the core 10a formed of a fibrous material which has its grain substantially perpendicular to the respective longitudinal faces of the metal plates 12 and 14, the method of bonding the core to the metal sheets being the same as that above described in connection with Fig. 1. The arrangement of the grain of the core material perpendicular to the respective longitudinal faces of the plates is the invention of Henry B. Gibbons and is described more fully and claimed in a co-pending application, Serial No. 513,619, filed December 9, 1943.

In Figs. 3, 4 and 5 there is illustrated one use of the sandwich structure of Fig. 1, wherein the structure is shown greatly exaggerated, better to illustrate the invention. In practice, however, the thickness of the entire sandwich may be as little as one-eighth of an inch. Fig. 5 illustrates as an example, a rib for the leading edge of an airplane wing structure and includes a core sheet generally indicated at 24 having its upper and lower margins shaped to conform to the curve of the airfoil section. The elements of the core are shown in Fig. 3 and comprise a thin sheet of balsa 26 having thin marginal strips 28, 29, 30, 31 and 32 of spruce, or other suitable material, which lie in the same planes as sheet 26 with their edges in abutting relation therewith. Preferably these marginal strips are adhesively secured to the balsa sheet. A reinforcing member 34 of spruce is provided for the aperture in the balsa sheet and is also adapted to be bonded to the margins 36 of the aperture so as to lie in the same planes as the sheet 26. It will also be noted that the reinforcing member 34 has a key portion 38 which lies between the marginal strips 31 and 32 and flush with the latter to provide continuous reinforcement at the rear edge of the core.

Metal plates 40 of aluminum are bonded to the opposite sides of the core 24, the method of bonding the plates to the core being identical with that described in connection with Fig. 1. It will be noted that the plates 40 overlie the sheet 26 and the reinforcing elements surrounding the margin thereof and are co-extensive with the entire core sheet 24. Metal strips are provided on the outside face of the plates which are generally co-extensive with the spruce strips 28, 29, 30, 31 and 32 on the core structure and are adapted to overlie the same with the metal sheet 40 interposed therebetween. Thus, the metal strips 42 and 44 overlie the corresponding spruce strips 28 and 30 while the metal strip 46 overlies the spruce strip 29. A single metal strip 48 overlies the spruce strips 31 and 32 as well as the interposed key 38.

It will thus be evident that when fastening elements 50, which may be in the form of rivets or bolts, are used as shown in Fig. 5 in the marginal portions of the assembly, these fastening elements pass through the marginal spruce strips which are stronger in compression than balsa wood. A nose plate 52 of metal having a lateral flange 53 is secured through fastening elements 54 to the leading edge of the rib, and upper and lower angle members 56 and 58 are secured along the upper and lower margins of the rib structure in a similar manner, the lateral flanges 59 of members 56 and 58 matching the flange 53 to provide a smooth surface to support the surface panels of the airfoil.

One construction for such surface airfoil panels is shown in Fig. 6 in which a wing 60 is shown in chord-wise section. As shown in this figure, the core 62 is formed of balsa wood with the grain of the wood running normal to the surface of the wing. The wing is formed of two generally U-shaped complemental shells 64 and 66 having their meeting edges joined as shown more in detail in Fig. 7 wherein spanwise metal plates 68 and 70 are adhesively secured, by the above process, to the under sides of the outer plates 72, 74 and the inner plates 76, 78 of the respective shells. In this process, as described above in connection with Fig. 1, the "Cycleweld" adhesive is first applied to all surfaces of the metal plates 68 and 70 to be joined and this coating is polymerized at 325° F. for approximately 15 minutes. These surfaces and the abutting surfaces of the plates 72, 74 and 76, 78 of sheets 64 and 66 which have already been similarly treated, as well as the surfaces of the core 62 which abut and which engage plate 68 are then coated with "Durez" No. 12,041 adhesive as previously described. The assembled wing section is then cured at the previously specified low temperatures and pressures, for example, 140° F. for four hours at atmospheric pressure or, if the sections are such as to require it, at suitably higher pressures which are not destructive to the balsa wood core. In the specific embodiment shown in Figs. 6 and 7 the surface plates 72, 74 and 76, 78 including the connecting members 68, 70 forming a part thereof are made of metal but as previously stated the surface plates of the sandwich may be formed of synthetic material.

Fig. 8 shows one means of securing removable sandwich type panels 80 to a similar panel 82 comprising a part of the framework of the airplane structure. Special angle shapes 84 and 86 are permanently bonded to the panel 82 by the method previously described in connection with Fig. 1 for bonding the lamination 12 to the core 10. The legs 88 and 90 of these angle shapes which lie parallel to the planes of the panels 80 have the panels 80 secured removably thereto by flush type screws 92 with pass through the panels 80 and are threaded into the legs 88 and 90.

In Fig. 9 another construction is shown in which removable panels 94 have threaded inserts 96 adhesively secured in recesses in the under surfaces thereof preferably prior to bonding the plates 98 thereto. Suitable cap screws 100 pass through the horizontal legs of angles 102 and are screw threaded into said inserts to secure the panels 94 detachably in place on the sandwich type panel 104 which may be, for example, a bulkhead. The vertical legs of angles 102 may be adhesively bonded to panel 104 as in the Fig. 8 construction or may be secured by rivets 103, as shown in Fig. 9.

In making the various structures comprising the surface panels and supporting framework thereof encountered in aircraft construction, the assemblies consisting of flat panels are preferably made as previously described in connection with Figs. 1 and 2. When the surfaces to be formed are curved, the same method can be followed if the curves are not too severe. For example, mild curves within the bending allowances of the materials comprising the sandwich can be produced by assembling the sandwich as a flat panel and placing it on a rigid mold having the desired shape prior to enclosing the assembly in the evacuated bag for the curing process. In this case, atmospheric pressure may be sufficient to cause the panel to conform to the mold. Greater pressure, as obtained in an autoclave, may allow a higher degree of forming than just atmospheric pressure. When compound or severe curves are present, the core and surface sheets are pre-cut and pre-formed. The metal sheets are then coated with resin, cured as previously described, and the coatings of the second resin are applied, after which the assembly is placed in a jig, or form, for the curing step. In some instances, it may be desirable to assemble the pre-cut and pre-formed elements of the sandwich in male and female dies before the resins set and apply pressure on the dies during the setting process, or it may be desirable to assemble the pre-cut and pre-formed elements of the sandwich on a rigid mold, a method described above in relation to panels of mild curvature. In any event, the final curing process is carried out at the relatively low temperature and pressure specified as contrasted with the high temperatures and pressures hereto required by others to obtain strength approaching the results obtained by this invention.

While atmospheric pressure or less and curing temperatures of 140° F. or under give very good results, in some instances where the material of the sandwich will permit it, temperatures as high as 212° F. and pressures as high as 100 pounds per square inch may be used to save time. However, a curing temperature of 212° F. and a pressure of 100 pounds per square inch is low when compared with prior methods of making adhesive bonds of comparative strength.

When molds are required for the production of curved surfaces, the molds can advantageously be made of a sandwich of wood and metal of the required shape, to produce a rigid mold of low cost which is very light in weight even for molds of very large size.

It will be evident that as a result of this invention an improved method has been provided for obtaining a superior bond between metallic surfaces, metallic and non-metallic surfaces, or between two non-metallic surfaces, without requiring the use of high temperatures and pressures.

It will also be evident that as a result of this invention a superior method has been provided for bonding metal and wood laminations by which an improved composite structure of this type is provided. Further, by reason of the use of two different resins, one of which has an affinity for metal and is cured prior to the assembly of the metal sheets with the wood core, and by the use of pressures which are low as contrasted with those formerly required, the use of light-weight, low density core materials for such composite panels has been greatly extended. For example, the 325° F. required to cure the "Cycleweld" cement coating on the facing sheet is above the desirable temperature for certain very desirable, light-weight core materials, but by curing the coating applied to the facing sheet prior to assembly with the core, the final curing can be carried out at a temperature well below the critical temperature for the core material, i. e. the temperature at which the material will be damaged. Similarly, pressures formerly required with cold setting adhesives, and pressures of or above 300 pounds per square inch required at 300 to 350° F. for thermo-setting adhesives are avoided by the process of the present invention, thus, for the first time, making it possible to use certain core materials, such as balsa, which will not withstand these high pressures.

It has been found in bonding together materials with different rates of thermal expansion in which the curing is carried on at the elevated temperature of, for example, 300° F., that severe stresses are placed on the bond when reduced to normal temperatures. The process of the present invention overcomes these difficulties, since the curing of the sandwich is carried out at relatively low temperature, which avoids such stresses.

It will thus be evident that the present invention not only greatly extends the use of composite structures for airplane manufacture, but enables the use of especially light-weight core materials heretofore impossible with the previous processes of manufacture of such structures, while obtaining many times the local rigidity and strength of an equivalent weight of aluminum alloy required in present airplane constructions. By reason of the simplicity of the improved process as contrasted with the conventional aircraft fabrication method, a construction is produced which is markedly less expensive. For example, the number of wing ribs required in wings made in accordance with the present invention may be approximately one-third the number required in all metal wing construction, thus not only greatly simplifying the work of constructing the wing but greatly reducing its cost and its weight.

Further, by utilizing this light weight, rigid sandwich construction in tooling for the production of aircraft, marked savings can be effected while producing molds which are readily handled even in the case of molds for the production of extensive surface panels for wing and fuselage structures.

The present invention is also particularly well-adapted for mass production of aircraft and results in a construction far superior to the present all-metal construction.

While the invention has been described particularly in connection with aircraft construction, it will be evident that the invention is not limited to this field but has many applications in other arts in which a light-weight, rigid sandwich type structure would be advantageous. It will further be understood that the particular temperatures and pressures specified are for illustrative purposes only and that the same may vary widely to meet different conditions encountered, and that the invention is limited in its scope only by the claims appendant hereto.

Having now described the invention so that others skilled in the art may clearly understand the same, what it is desired to secure by Letters Patent is as follows:

1. A body comprising complemental sections, each comprising a laminated shell including a core of light cellular material and inner and outer plates of metal permanently bonded thereto, and means for connecting the abutting edges of said shells including a metal strip extending along said abutting edges on the inner face of and overlapping the abutting plates thereof and adhesively bonded thereto.

2. A body comprising complemental sections, each comprising a laminated shell including a core of light cellular material and inner and outer plates of metal permanently bonded thereto, and means for connecting the abutting edges of said shells including metal strips extending along said abutting edges on the inner faces of and overlapping the abutting plates thereof and adhesively bonded thereto through the interaction of two phenol-formaldehyde base resins polymerized through the application of low pressures and low temperatures.

HENRY B. GIBBONS.
EUGENE G. ZOLDY.

REFERENCES CITED

The following references are of record in the file of this patent:

UNITED STATES PATENTS

| Number | Name | Date |
| --- | --- | --- |
| 785,521 | Roach | Mar. 21, 1905 |
| 1,019,407 | Baekeland | Mar. 5, 1912 |
| 1,077,200 | Maurer | Oct. 28, 1913 |
| 1,398,143 | Novotny | Nov. 22, 1921 |
| 1,549,320 | Lundin | Aug. 11, 1925 |
| 1,559,846 | Brown | Nov. 3, 1925 |
| 1,565,532 | Tupper | Dec. 15, 1925 |
| 1,634,809 | Weiss | July 5, 1927 |
| 1,771,567 | Auld | July 29, 1930 |
| 1,954,130 | Higgins | Apr. 10, 1934 |
| 1,972,307 | Loetscher | Sept. 4, 1934 |
| 2,015,306 | Menger | Oct. 1, 1935 |
| 2,062,088 | Dreyer | Nov. 24, 1936 |
| 2,117,085 | Ensminger | May 10, 1938 |
| 2,180,934 | Dent et al. | Nov. 21, 1939 |
| 2,233,875 | Schmidt et al. | Mar. 4, 1941 |
| 2,304,718 | Swart | Dec. 8, 1942 |
| 2,306,295 | Casto | Dec. 22, 1942 |
| 2,317,364 | De Bruyne et al. | Apr. 27, 1943 |
| 2,376,854 | Saunders et al. | May 22, 1945 |

FOREIGN PATENTS

| Number | Country | Date |
| --- | --- | --- |
| 145,123 | Great Britain | June 21, 1920 |
| 453,648 | Great Britain | Sept. 14, 1936 |

OTHER REFERENCES

Cycleweld article published in "Modern Plastics" of September 1943, pages 65-69 and 152. (Copy in Division 33.)